F. R. WOODWARD.
MAGAZINE GLASS CUTTER.
APPLICATION FILED AUG. 21, 1912.
1,134,307.
Patented Apr. 6, 1915.
2 SHEETS—SHEET 1.
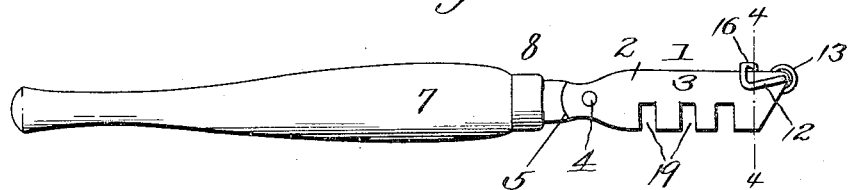
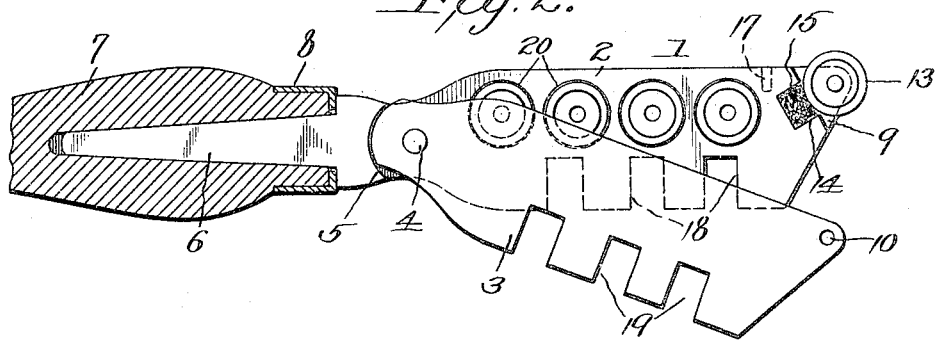
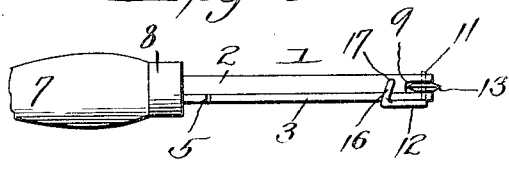
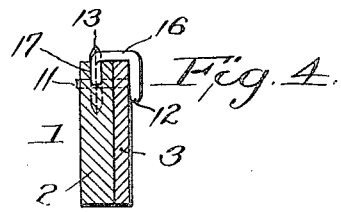
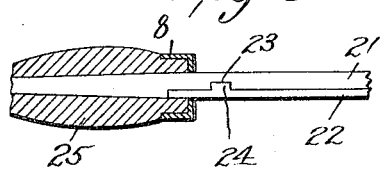
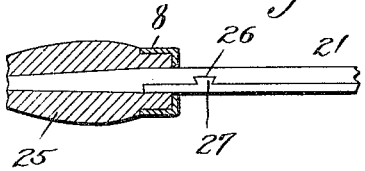
WITNESSES
INVENTOR
F. R. Woodward
By E. B. Stocking Attorney

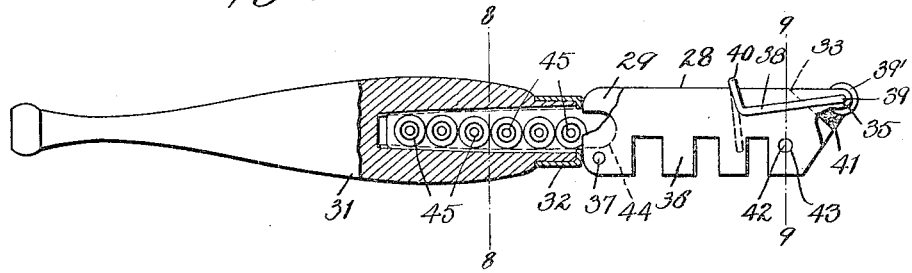

United States Patent Office.

FRANK R. WOODWARD, OF HILL, NEW HAMPSHIRE, ASSIGNOR OF ONE-HALF TO SMITH & HEMENWAY COMPANY, INCORPORATED, OF NEW YORK, N. Y.

MAGAZINE GLASS-CUTTER.

1,134,307.

Specification of Letters Patent. Patented Apr. 6, 1915.

Application filed August 21, 1912. Serial No. 716,232.

*To all whom it may concern:*

Be it known that I, FRANK R. WOODWARD, a citizen of the United States of America, residing at Hill, in the county of Merrimack and State of New Hampshire, have invented certain new and useful Improvements in Magazine Glass-Cutters, of which the following is a specification.

This invention relates to certain new and useful improvements in glass cutting tools, the object being to provide a tool which is so constructed that the cutting wheel can be easily and quickly placed in position within the head, or detached therefrom; means also being provided for lubricating the cutter when in operation.

Another object of my invention is to provide a glass cutter with a sectional head formed of a pair of sections one section being movable in respect to the other, the fixed section having a plurality of wheel-retaining pockets in which a number of cutter wheels can be placed, and held in reserve so that a new cutter can be inserted as desired.

A further object of the invention is to provide novel means for holding the sections in position with respect to each other; said means also forming a journal bearing for the cutter wheel.

Other and further objects and advantages of the invention will be hereinafter set forth and the novel features thereof defined by the appended claims.

In the drawings—Figure 1, is a side elevation of a glass cutter constructed in accordance with my invention; Fig. 2, is an enlarged side elevation partly in section, the movable section being swung to one side showing the position of the auxiliary cutters in position within the pockets and the lubricating means for the cutter wheel in use; Fig. 3, is a top plan view of the glass cutter, the handle being partly broken away; Fig. 4, is a section taken on the line 4—4 of Fig. 1; Fig. 5, is a detail view of a modified form of fastening the movable section in respect to the fixed section; Fig. 6, is still another modified form showing another manner of accomplishing this result; Fig. 7, is a side elevation of another modified form of glass cutter, partly in section; Fig. 8, is a section taken on the line 8—8 of Fig. 7; Fig. 9, is a section taken on the line 9—9 of Fig. 7; Fig. 10, is a top plan view partly broken away; Fig. 11, is a side elevation of still another modified form of glass cutter partly broken away; Fig. 12, is a side elevation; the movable section being shown swung to one side, and the handle broken away; Fig. 13, is a section taken on the line 13—13 of Fig. 11; and Fig. 14, is a top plan view of the cutter; the handle being broken away.

Like numerals of reference, refer to like parts in the several figures of the drawings.

In the drawings, 1 indicates the head of the cutter, which is preferably formed of the ordinary shape and comprises a fixed section 2 and a movable section 3 which is pivotally mounted upon the fixed section by a pivot pin 4; said fixed section having a shoulder 5 coacting with the end of the movable section 3, and the fixed section is provided with a reduced shank 6 which is secured within the wooden handle 7 in the ordinary manner, which is provided with the usual ferrule 8.

The fixed section of the head 1 is of a greater thickness than the movable section and the end thereof is reduced as shown at 9, the side wall thereof, being provided with an opening which is adapted to aline with an opening 10 formed in the movable section 3 and through which the journal portion 11 of a retaining member 12 is adapted to pass, and on which is mounted a cutter wheel 13 as clearly shown in the drawings, which enables the cutter wheel to be inserted or removed as desired, as will be later described.

The shoulder formed by the reduced portion on the fixed section of the head, is notched to form a swab-chamber 14, in which is arranged absorbent material 15 which is adapted to be engaged by the peripheral cutting edge of the cutting wheel 13 which is of such a diameter that it extends within the chamber 14 and contacts with the swab arranged therein, in order to thoroughly lubricate the cutter wheel at all times. The absorbent material forming the swab is retained within the chamber 14 by the movable section, and the space between the movable and fixed section forms a passage through which oil can penetrate when the head is dipped into the lubricant, so that the swab will be maintained thoroughly soaked with oil at all times.

The retaining member 12 is provided with a substantially inverted U-shaped end 16, the free leg thereof being adapted to enter a recess 17 formed in the top of the fixed section 2 so as to securely fasten the two sections together. By this construction, it will be seen that when the free end of the retaining member is swung outwardly, out of the recess 17 and the same is moved laterally so as to withdraw the journal end out of the openings of the sections, the cutter wheel 13 will be free to be withdrawn, and the movable section can be swung to one side in order to facilitate the removal of the cutter wheel.

The sections of the head are provided with registering notches 18 and 19, and the fixed section above the notches is provided with a series of circular recesses forming wheel retaining pockets 20 in which a number of cutter wheels can be placed, which will be retained therein by the movable section when swung into position to receive the journal of the retaining member. These wheels will be maintained in good condition by the lubricant which will pass between the sections and enter the pockets when the head is dipped within a can of oil.

In the modification shown in Fig. 5, I provide a head having a fixed section 21 and a movable section 22, the fixed section having a transverse groove 23 to receive a transverse rib 24 formed on the movable section, and said sections are adapted to be retained in their proper position by the wedging action of the handle 25, whereby the use of a pivot is dispensed with, and a head is formed with a fixed and movable section which can be easily separated in order to remove or insert the cutter wheel.

In the modification shown in Fig. 6, the fixed section of the head is provided with a dove-tailed groove 26 and the movable section is provided with a dove-tailed rib 27 coacting with the groove. The sections are held together in a similar manner to that disclosed in Fig. 5, the ribs on the movable section being formed so as to prevent the movable sections from moving longitudinally in respect to the fixed section, when the same is being forced within the handle.

The retaining member 12 is preferably formed of wire and the U-shaped portion is of such a size that in order to place the same in position it is necessary to spring the legs thereof apart slightly so that the tension will draw the sections of the head together and retain them in that position. The intermediate portion of the retaining member bearing upon the side of the movable section of the head tends to hold the two sections firmly and the friction between the retaining member and the sections retains the member in position so that the bearing portion will be held firmly for the cutter wheel.

In the modification shown in Figs. 7, 8, 9 and 10, the head 28 is formed of sections comprising two outside sections and a central section 29 which is fixed to the outside section 30 which is provided with a shank secured within a handle 31 by a ferrule 32. The central section 29 is cut away as shown at 33, and the outside section 30 is provided with an opening 34 adapted to register with the opening 35 formed in the pivotally mounted outside section 36, which is mounted upon a pivot as shown at 37 and constitutes the movable section of the head. A retaining yoke member 38 having a bearing portion 39, adapted to pass through the openings 34 and 35, and on which a cutter wheel 39' is pivotally mounted between the two outside sections; said retaining member having a U-shaped portion 40 which is adapted to straddle the sections of the head and maintain the retaining member and the sections in their proper positions. Packing or absorbing material 41 is arranged within the pocket formed by the cut-out portion 33 of the central section, and is adapted to contact with the cutter wheel 39' and when in use, the cutter is dipped in the oil so as to allow the absorbent material to absorb the oil and apply the same to the cutter wheel. The pivot 37 upon which the movable section of the head is mounted, also retains the central section to the other outside section or fixed section, and a rivet 42 securing these sections together, extends outwardly laterally beyond the side face of the central section and is adapted to enter an opening 43 formed in the movable section so as to securely lock the movable section in position upon the fixed section. Instead of forming the fixed section of the head with a plurality of retaining pockets, I provide the central section thereof, with a cut away portion 44 forming a receiving or retaining pocket which communicates with an opening formed in the handle 31 arranged alongside of the shank of the head and into which a number of cutter wheels 45 can be carried in order that the user of a cutter will have additional cutter wheels ready at all times to be inserted when desired.

In the modification shown in Figs. 11, 12, 13 and 14, the head of the cutter is formed substantially in the same manner as that described in Figs. 7, 8, and 9, and comprises a fixed section 46 and a movable section 47 the fixed section being formed of sections secured together in substantially the same manner as that previously described, by rivets 48 and 49, which extend outwardly and the rivet 48 forms a bearing upon which the movable section 47 swings. The rivet 49 projects into a recess 50 when the movable section is swung into position, which serves the purpose of maintaining the sections in their proper position so as to form a complete cutter. The central section of the fixed section is provided with a circular recess 51 which communicates with the recess formed by the cut away portion 52 and in which absorbent or packing material 53 is adapted to be arranged for applying lubricant to the cutter wheel 54, which is carried by a bearing 55 fixed in the movable section having a projecting end portion which is adapted to fit within an opening 56 formed in the fixed section of the head; and it will be seen that by this construction, the cutter wheel is carried by the pivot pin so that the same can be placed in position upon the pivot pin before the movable section is swung into folded position. The central section is also cut away to form a receiving or retaining pocket 57 which communicates with a recess 58 formed in the handle adjacent the shank of the head, in which the cutter wheels 59 are adapted to be carried in a similar manner to that disclosed in Figs. 7, 8, 9 and 10. The advantage of the construction set forth in Figs. 11, 12, 13 and 14, is that the retaining member for the cutter wheel is a fixed member of the movable section of the head, and facilitates the insertion or removal of the cutter wheel. This construction also simplifies the manufacture of the glass cutter and reduces the cost thereof, to such an extent that the same can be sold very cheaply, as the head is formed of sections which can be built up; the rivets used for securing the sections of the fixed section together forming means for retaining the movable section in folded position as well as the bearing upon which the same swings, in order to remove the wheel or to open the retaining pocket in order to allow cutter wheels to be inserted or removed therefrom.

I claim:

1. A glass cutter, having a sectional head formed of two sections having contacting side faces, the abutting face of one section being provided with wheel-retaining pockets, one of said sections being movably mounted in respect to the other section, means for holding said sections with their side faces in contact for closing the wheel-retaining pockets, and a revoluble cutter wheel journaled between said sections.

2. A glass cutter having a sectional head, one section being movable in respect to the other section, a pocket formed in the fixed section, means carried by the fixed section for locking the movable section over said pocket, and a cutter wheel journaled between the sections of said head.

3. A glass cutter, comprising a head composed of a fixed section and a movable section, said sections having contacting side faces, the fixed section of said head being provided with a shank, a handle arranged over said shank, said sections having registering openings at one end thereof, a cutter wheel arranged between said sections in alinement with said openings, and a retaining member having means at one end for holding the cutter wheel in position between said sections and at its other end, means for fastening said sections together.

4. A glass cutter comprising a fixed section, and a movable section, said fixed section being provided with a reduced portion, the wall thereof being notched to form a swab-chamber, a swab arranged within said chamber, a cutter wheel arranged within the reduced portion of said fixed section extending into said swab chamber, and a pin passing through said sections upon which said cutter wheel is mounted.

In testimony whereof I affix my signature in presence of two witnesses.

FRANK R. WOODWARD.

Witnesses:
FRANK PROCTOR,
G. B. CLEMENT.

Copies of this patent may be obtained for five cents each, by addressing the "Commissioner of Patents, Washington, D. C."